US011042707B2

United States Patent
Garrote

(10) Patent No.: US 11,042,707 B2
(45) Date of Patent: Jun. 22, 2021

(54) CONVERSATIONAL INTERFACE FOR APIS

(71) Applicant: MULESOFT, LLC, San Francisco, CA (US)

(72) Inventor: Antonio Garrote, London (GB)

(73) Assignee: Mulesoft, LLC, San Francisco, CA (US)

( * ) Notice: Subject to any disclaimer, the term of this patent is extended or adjusted under 35 U.S.C. 154(b) by 112 days.

(21) Appl. No.: 16/232,730

(22) Filed: Dec. 26, 2018

(65) Prior Publication Data

US 2019/0197111 A1 Jun. 27, 2019

Related U.S. Application Data

(60) Provisional application No. 62/609,698, filed on Dec. 22, 2017.

(51) Int. Cl.
*G06F 40/30* (2020.01)
*G06F 40/295* (2020.01)

(52) U.S. Cl.
CPC ............ *G06F 40/30* (2020.01); *G06F 40/295* (2020.01)

(58) Field of Classification Search
CPC ........ G10L 17/22; G06N 5/04; H04L 61/1564
See application file for complete search history.

(56) References Cited

U.S. PATENT DOCUMENTS

| | | | | |
|---|---|---|---|---|
| 2008/0010069 A1* | 1/2008 | Katariya | ................ | G06F 9/451 704/257 |
| 2015/0142704 A1* | 5/2015 | London | ................ | G06N 5/022 706/11 |
| 2015/0149182 A1* | 5/2015 | Kains | ..................... | G10L 15/18 704/275 |
| 2016/0087933 A1* | 3/2016 | Johnson | ............ | H04W 12/0023 709/245 |
| 2016/0179908 A1* | 6/2016 | Johnston | ............. | G06F 16/9537 707/724 |
| 2018/0082197 A1* | 3/2018 | Aravamudan | ........... | G06F 40/30 |
| 2018/0083901 A1* | 3/2018 | McGregor, Jr. | ......... | H04L 51/32 |

* cited by examiner

*Primary Examiner* — Anne L Thomas-Homescu
(74) *Attorney, Agent, or Firm* — Steine. Kessler. Goldstein &. Fox P.L.L.C.

(57) ABSTRACT

This disclosure relates to a mechanism to create conversational agents from API specifications based on domain-specific inputs. The conversational agents may provide the functionalities exposed by the underlying API to users engaging with the conversational agent. Thus, the user may execute actions exposed by the API specification using natural language in a conversational, comfortable, and familiar fashion.

17 Claims, 4 Drawing Sheets

CONVERSATIONAL INTERFACE FOR APIS

CROSS REFERENCE TO RELATED APPLICATIONS

This application claims the benefit of U.S. Provisional Patent Application No. 62/609,698 by Garrote, "Conversational interface For APIs," filed Dec. 22, 2017, which is incorporated by reference herein in its entirety.

BACKGROUND

An interactive agent, sometimes referred to as a bot, chatbot, virtual robot, or talkbot is an artificial-intelligence-engagement platform that simulates human conversation through voice commands, text messages, or both. Where customers would previously navigate through menus on a webpage, send an email, call a business on the telephone, or visit in person, customers may communicate with interactive agents to more efficiently and effectively troubleshoot issues, get answers to questions, and solve problems.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
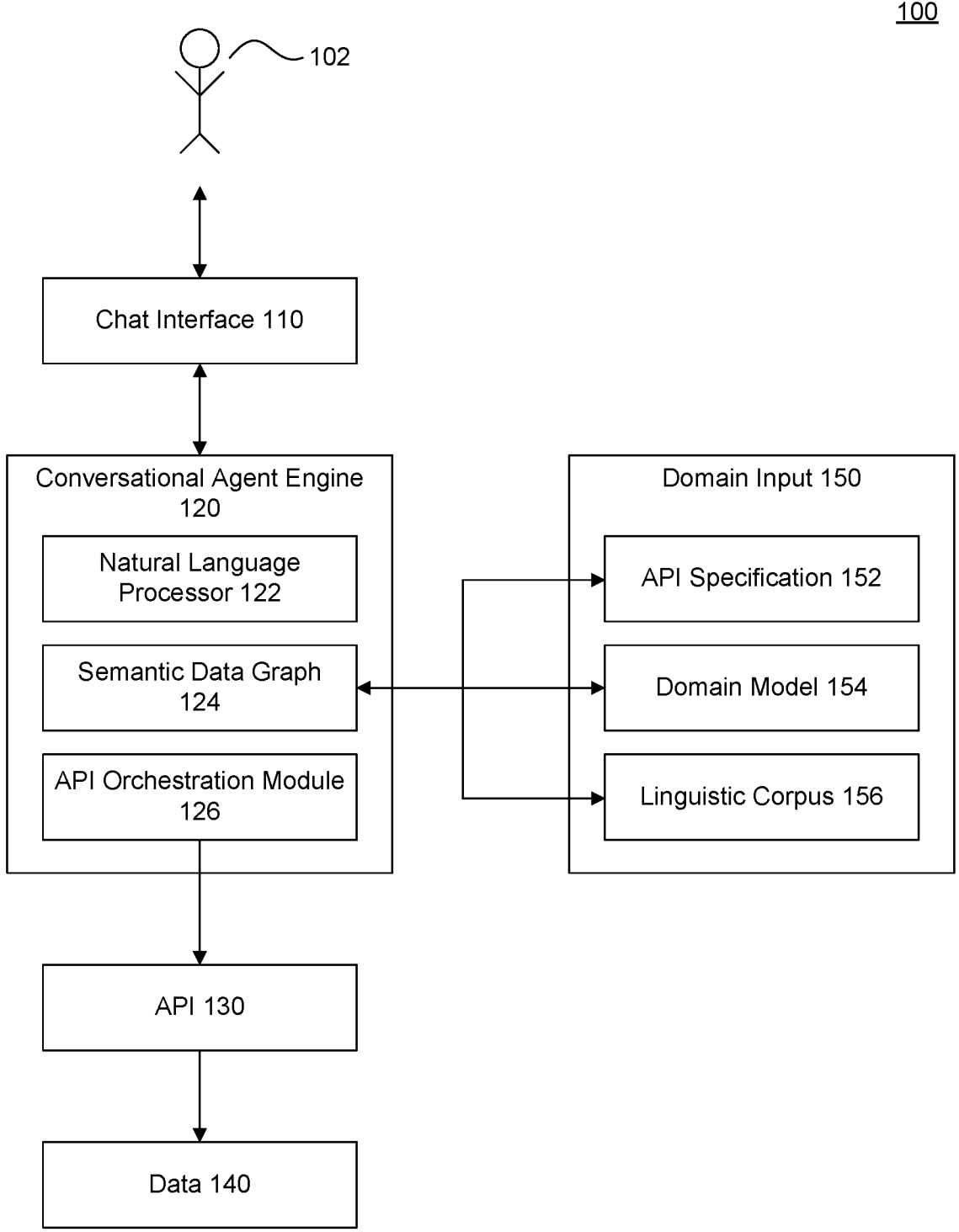
FIG. 1 is a block diagram of an interactive agent architecture, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for creating conversational agents from application programming interface (API) specifications and using the conversational agents to translate received natural language to operations performable at API endpoints specified in the API specifications.

An interactive agent may provide a convenient and beneficial means through which businesses may answer questions, diagnose problems, and furnish solutions to customers without devoting human resources, time, or energy. Where businesses would previously maintain expansive, expensive, and potentially inefficient call centers to handle customer inquiries, businesses may now configure interactive agents to quickly, efficiently, and competently handle repetitive tasks and address customer needs. These interactive agents may access to information and automated capabilities while interacting with customers in a conversational, comfortable, and familiar fashion.

Interactive agents have become increasingly mainstreamed, occupying devices in homes and businesses and integrating with social networks while being distributed across the Internet. To deploy an interactive agent tailored to a particular domain, industry, or practice area, a business may need to design and implement flows, dialogs, rules, logical constructs, and data structures to frame an interactive agent's behavior and empower the interactive agent to meet the business's customers' unique and varied needs.

Traditional approaches to developing interactive agents evolved from attempts to replicate human interactions that occur during customer service events. Thus, legacy methods for creating interactive agents suffer a bias towards task orientation, i.e., solving specific and pre-programmed tasks using concrete constructs and pre-programmed modules. These legacy methods model interactive agents as sets of dialogue templates, referred to as intents, that users may trigger or engage. Intents may have parameters, sometimes referred to as slots, that users may configure. Legacy methods may further include descriptions of context in templates that may filter intents and provide default values for slots. One skilled in the relevant arts will appreciate that building interactive agents using these traditional approaches may be a time-consuming, resource-intensive process and that extending interactive agents into new domains may be problematic and complicated.

Accordingly, a need exists to provide businesses with tools to simplify the deployment of conversational agents by basing a conversational agent's behavior on an API specification. An interactive agent may access integrated system functionalities made available by a myriad of ancillary systems, accessible via APIs, exposed functions and routines, and other appropriate protocols. By building the conversational agent based on the available APIs, businesses may allow customers to access the integrated systems and effectively harness the full capabilities of back-end, ancillary systems, all while interacting with a domain-specific conversational agent via natural language.

FIG. 1 is a block diagram of an interactive agent architecture 100, according to some embodiments. Interactive agent architecture 100 may include user 102, chat interface 110, conversational agent engine 120, natural language processor 122, semantic data graph 124, API orchestration model 126, API 130, data 140, domain input 150, API specification 152, domain model 154, and linguistic corpus 156.

User 102 may be a customer interfacing with interactive agents through a suitable conversational medium. User 102 may be an individual (i.e., a human being) or group of such individuals. In an embodiment, user 102 may interact with an interactive agent to accomplish a task, gather information, or complete other appropriate goals. For example, user 102 may converse with an interactive agent to order a pizza from a pizzeria, receive suggestions about particular goods or services from a retailer, obtain customer support for a technical problem, view a weather forecast on a home device, hear the news, schedule a meeting, make travel plans, receive a restaurant recommendation, get directions to a desired location, or perform any other suitable tasks. One skilled in the relevant arts will appreciate that the goals and objectives of user 102 may be expansive, vast, and disparate across individuals and organizations.

Chat interface 110 provides a means by which user 102 may interface or engage with an interactive agent. In an embodiment, communications in chat interface 110 may be text-based, speech-based, sound-based, image-based, video-based, any combination thereof, or occur in any other suitable communication medium. For example, chat interface 110 may be Messenger, Slack, Chatterbox, WhatsApp, Email, Skype, or other suitable text-based communication platform. In another embodiment, chat interface 110 may facilitate verbal exchanges, for example, in auditory conversational interactions with internet-of-things devices such as Alexa, Google Home, HomePod, etc. In another embodiment, chat interface 110 may facilitate the interpretation of sign language performed in a video communication system. Chat interface 110 may further receive videos or images along with text or audible natural language. Chat interface 110 may facilitate network-based communications, such networks including any or all of a LAN, WAN, the Internet, or other public network. The medium in which such conversations or interactions occur is non-limiting, and chat interface 110 may allow user 102 to interface with an interactive agent in any suitable protocol, medium, or conversational approach and/or any combination thereof.

Conversational agent engine 120 may be a bot, chatbot, virtual robot, talkbot, or other computer program that simulates human conversation by returning to user 102 appropriate voice responses, text answers, or other suitable communications. In exemplary embodiments, conversational agent engine 120 may service customers' inquiries, answer customers' questions, troubleshoot and diagnose issues, and address general customer needs or concerns. Conversational agent engine 120 may respond to customers using pre-defined or intelligently formed, ad-hoc text strings to ask pertinent additional questions to gather further information about a customer's inquiries. Conversational agent engine 120 may collect data from available data sources, run scripts or executables, and transition customers to other resources, e.g., a customer-service representative or another conversational agent. Furthermore, to better serve customers, an interactive agent may access available APIs and other communication protocols to automatically leverage additional available functionalities in a given system. Conversational agent engine 120 may include natural language processor 122, semantic data graph 124, and API orchestration module 126.

Natural language processor 122 may leverage natural language processing techniques and approaches to decipher and interpret text or speech received from user 102 via chat interface 110. Natural language processor 122 may parse textual commands introduced by user 102 using semantic parsing. Natural language processor 122 may leverage information in a linguistic corpus (described below as linguistic corpus 156) and information in the semantic constraints in a semantic data graph (described below as semantic data graph 124) to transform text into a traversal across domain-specific entities and properties. Natural language processor 122 may employ any suitable solution to process the linguistic information. In an embodiment, natural language processor 122 may use lexical syntactic analysis and linguistic grammars to derive meaning from natural language received from user 102. In another embodiment, natural language processor 122 may employ distributional approaches, frame-based or theoretical approaches, machine learning techniques, and a myriad of other approaches to analyze received natural language, determine the intent of user 102, and determine appropriate actions to conduct in response to the derived meanings and intents.

Semantic data graph 124 may be employed by conversational agent engine 120 to translate received natural language into a sequence of calls to available APIs endpoints to execute operations available thereon. Semantic data graph 124 may employ deterministic and/or probabilistic approaches to provide a semantic grammar used in interpretation of natural language and the determination of pertinent domain-specific operations and API endpoints. Semantic data graph 124 may be generated using an appropriate modeling language, for example anything modeling language (AML), or other suitable approach for creating vocabularies describing semantics, linked data, and related ecosystems. Semantic data graph 124 may be derived by combining a set of annotated API specifications (i.e., API specification 152) and a domain model (i.e., domain model 154) into an in-memory (or otherwise suitably stored) representation of a domain-entity graph connected by properties and relations. Semantic data graph 124 may connect the list of concepts and properties shared between API specification 152 and linguistic corpus 156, described in further detail below. In semantic data graph 124, each entity may be accessible as an API endpoint that may be invoked by a client library for a supported API protocol, e.g., HTTP, HTTPS, UDP, FTP, or other suitable web protocol. In semantic data graph 124, relations across entities in the graph may be mapped to operations in particular API endpoints that may accept input parameters. Such input parameters may be ascertained using natural language processor 122 as part of the interpretation of received natural language. Thus, semantic data graph 124 may be used to direct semantic parsing of received textual commands from user 102 when regarded as a semantic graph model while simultaneously extracting available functionality from a mapped API when used as a graph of network API endpoints and operations.

API orchestration model 126 may receive input from user 102 that may be represented as a tree traversal over semantic data graph 124. In one embodiment, API orchestration model 126 may receive the input through a query engine capable of accepting the description of the APIs along with semantic annotations to compute a query. API orchestration model 126 may leverage an underlying annotated API specification to orchestrate actual network requests, i.e., calls via HTTP to determined API endpoints. Thus, API orchestration model 126 may perform or otherwise satisfy commands introduced by user 102 in chat interface 110. API orchestration model 126 may further received a response, verification, and/or output from the command and return the output to user 102 in a suitable format via chat interface 110. API orchestration model 126 may interact with available system resources, protocols, operations, etc., as exposed by API 130, described in further detail below.

API 130 may be a set of subroutine definitions, communication protocols, and other tools that extend software applications and functionalities to external and internal accessors. API 130 may allow one software program to access the functions, variables, and data structures of another software program in a controlled and secure fashion. API 130 may include functions, data structures, classes, variables, remote calls, and other programming constructs that allow a conversational agent, such as conversational agent engine 120, to access an integrated system and leverage programmed functionality extended therefrom. API 130 may be defined, described, or detailed by an API specification, such as described below as annotated API specification 152. API 130 may further define a software interface that defines and controls the routines, protocols, and tools exposed via the API specification. One simple example of API 130 may be a map-providing API, that allows accessors to access geographical positional or locational data and functions. In the context of a web application, such an mapping API may provide operations to embed a map in a webpage, while in the context of a conversational interface, the API may provide operations to provide directions to a requesting user in natural language.

Data 140 may be databases, data archives, data lakes, data warehouses, blobs, repositories, documents, files, client first party data and/or other structured and unstructured storage mechanisms. Data 140 may be accessed by API 130 or by conversational agent engine 120 via API 130. Data 140 may be housed in, for example, a relational database, a NoSQL database or other horizontally scaling database, or any other database adhering to a suitable database design methodology. Data 140 may harness any commercially available database management system to store data or implemented in a customized database management system. In an embodiment, data 140 uses a centralized storage area network (SAN), network-attached storage (NAS), redundant array of independent disks, and/or any other configuration of storage devices to supply sufficient storage capacity to store exposed data and internal data. Sufficient storage may alternatively exist in any other physically attached magnetic storage, cloud storage, or additional storage medium. In an embodiment, data 140 deploys a hard-disk interface, such as ATA, SATA, SCSI, SAS, and/or fibre for interfacing with storage mediums. In the above mapping example of API 130, data 140 may house coordinates, road information, landmarks, positional data, topographical information, and other information related to the mapping functions of API 130. One skilled in the relevant arts will appreciate that the nature of data 140 will vary based on the properties of API 130.

Domain input 150 may be domain-specific information used by conversational agent engine 150 to build and deploy domain-specific conversational interfaces. For example, in a "finance" domain, domain input 150 may include inputs specific to the "finance" domain, e.g., definitions for terms and concepts used in the financial sector, annotated API specifications relevant to financial applications and customers, and linguistic corpora of financial language. Domain input 150 may include API specification 152, domain model 154, and linguistic corpus 156.

API specification 152 may provide descriptions about performable functions and exposed data provided by API 130. API specification 152 may be written in RAML, YAML, OAS, or other suitable human-readable and machine interpretable format. API specification 152 may provide a textual format that encodes a machine-readable description of a backend or ancillary system accessible via HTTP or any other network communication protocol. API specification 152 may include a description of API endpoints, operations, data shapes for requests and responses, and any input parameters required to manipulate data stored in data 140 and exposed by API 130. API specification 152 may further include connections explicitly as hyperlinks or implicit as target operations across endpoints in a single API or across APIs.

Domain model 154 may be a textual format that encodes a formal model or ontology for a particular domain. Domain model 154 may be specified using the ontology web language (OWL) or other logical formalism capable of representing rich knowledge about things and relationships between things. Domain model 154 may include descriptions of the semantics for a domain such as concepts, taxonomies, data type properties, or relations across entities. For example, in a financial domain, domain model 154 may describe concepts such as "customers" and "accounts," taxonomies such as "bank account" is a type of "account," data type properties such as "ISBN" is a string property of a "bank account," and relations such as "HasBankAccount" relates "customers" to "accounts."

Domain model 154 may provide or otherwise apply semantic annotations into API specification 152. Such semantic annotations may connect semantics provided within domain model 154 to API specification 152 and linguistic corpus 156, described below. These semantic annotations may indicate that an API endpoint produces responses encoding information for a domain entity or mark some of the fields of the data returned as domain properties. In an embodiment, extension mechanisms (e.g., RAML annotations or OAS extensions) may be used to provide the semantic annotations, but any suitable method of including the semantic annotations may be used.

Linguistic corpus 156 may be domain-specific, vocabulary information or other linguistic data about the domain model entities, properties and relations. Linguistic corpus 156 may be a database, data archive, data lake, data warehouse, blob, repository or other data storage mechanism containing illustrative linguistic data. Linguistic corpus 156 may include word vectors, synonyms, hypernyms, hyponyms, and other linguistic constructs. Linguistic corpus 156 may be readable, interpretable, or otherwise deployable by conversational agent engine 120. Linguistic corpus 156 may be used to connect specific linguistic information to concepts defined in domain model 154 using semantic annotations that may be used to include, carry, and support the inclusion of metadata (e.g., RDFa).

Figure 2:
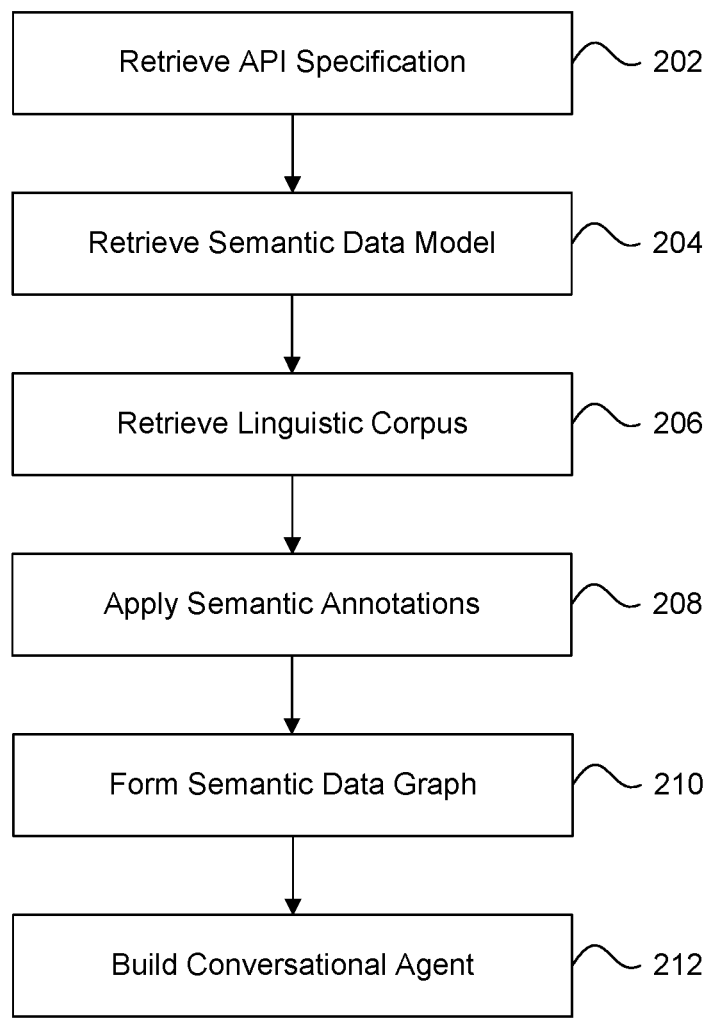
FIG. 2 illustrates a method for building a conversational agent, according to some embodiments.

FIG. 2 illustrates a method 200 for building a conversational agent, according to some embodiments. Method 200 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

In 202, conversational agent engine 120 may retrieve an API specification, such as API specification 152. Conversational agent engine 120 may retrieve an API specification that describes performable functions or operations provided by API 130 and data exposed by API 130. Conversational agent engine 120 may retrieve API specification 152 from local or cloud storage or other suitable storage medium. The retrieved API specification may describe domain-specific API endpoints, operations, parameters, request protocols, etc. In an embodiment, conversational agent engine 120 may retrieve semantic annotations from the retrieved API specification.

In 204, conversational agent engine 120 may retrieve a semantic data model, such as domain model 154. The retrieved semantic data model may describe domain semantics such as concepts, taxonomies, data type properties, and entity relationships. In an embodiment, conversational agent engine 120 may employ an OWL parser or other suitable XML parser to retrieve the semantic data model and store a usable version of the semantic data model in temporary or permanent storage. In one embodiment, conversational agent engine 120 may retrieve additional semantic annotations in domain model 154.

In 206, conversational agent engine 120 may retrieve a linguistic corpus, such as linguistic corpus 156, including a collection of domain-specific text, speech, or other natural language. Conversational agent engine 120 may retrieve domain-specific entities, properties, and relations. Conversational agent engine 120 may retrieve the linguistic corpus using SQL, via a file system protocol or web protocol, or using any other suitable retrieval mechanism.

In 208, conversational agent engine 120 may apply semantic annotations to the API specification, semantic data model, and linguistic corpus. In one embodiment, the semantic annotations may exist in the API specification, semantic data model, and linguistic corpus and conversational agent engine 120 may interpret or read the semantic annotations. In another embodiment, conversational agent engine 120 may apply or write the semantic annotations to the inputs in domain input 150. Conversational agent engine 120 may connect domain model 154 to API specification 152 and linguistic corpus 156 with the semantic annotations. For example, semantic annotations may be applied that indicate that an API endpoint responds to a domain entity. For further examples, conversational agent engine 120 may mark returned data as domain properties, or conversational agent 120 may connect linguistic information contained in linguistic corpus 156 to concepts defined in domain model 154.

In 210, conversational agent engine 120 may form a semantic data graph, such as semantic data graph 124, based on the annotated API specification, the semantic data model, and the linguistic corpus. Conversational agent engine 120 may transform the annotated API specification and domain model into a representational graph of domain entities connected by properties and relations. Conversational agent engine 120 may create a representational graph where each entity may be access via an API endpoint and an operation or operations performable at the API endpoint.

In 212, conversational agent engine 120 may build and deploy a conversational agent based on the semantic data graph. Such a conversational agent may be provided as compiled code, interpretable code, executable code, an API interface, a web application, or other suitable distribution method. User 102 may send natural language to the conversational agent in a myriad of forms and receive responses from the conversational agent, as described below with reference to FIG. 3. Accordingly, unlike a traditional approach requiring a business representative to determine intents, slots, and parameters to roll out a conversational agent covering a new domain, a business representative may build and deploy a conversational agent based on an API specification.

Figure 3:
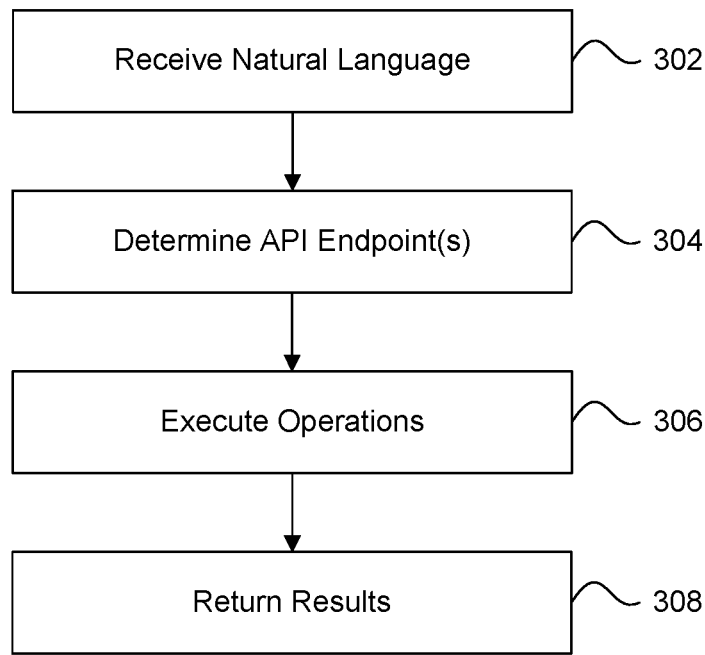
FIG. 3 illustrates a method for receiving natural language and executing an operation at an API endpoint based on the received natural language, according to some embodiments.

FIG. 3 illustrates a method 300 for receiving natural language and executing an operation at an API endpoint based on the received natural language, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, conversational agent engine 120 may receive natural language from user 102 via chat interface 110. Conversational agent engine 120 may receive the natural language as text, speech, audio, video, images, or via any other appropriate communication medium or combination thereof. Conversational agent engine 120 may load a semantic parser, which may be represented by a neural network, a context free grammar, or other linguistic construct or natural language interpretation technique performable by natural language processor 122. For example, user 102 may request directions to a location in natural language received via chat interface 110.

In 304, conversational agent engine 120 may determine any API endpoint(s) as well as operations and parameters performable at the API endpoint(s). After loading the semantic parser in 302, conversational agent engine 120 may translate commands and queries from the natural language representation to actual API calls specified in API specification 152. Conversational agent engine 120 may leverage semantic annotations included in API specification 152 to determine appropriate CRUD operations and queries using metadata to understand how to execute queries against the data model. Conversational agent engine 120 may employ natural language processor 122 to determine the API endpoint(s) and operation(s) with semantic data graph 124. Semantic data graph 124 may be built based on API specification 152, domain model 154, linguistic corpus 156, and pertinent semantic annotations, as described above with reference to FIG. 2. Conversational agent engine 120 may further determine parameters needed by the API endpoint(s) and operation(s) using semantic data graph 124. In the simple example, conversational agent engine 120 may determine a parameter of "Location" to be used to determine where user 102 wishes to receive directions to. The parameter may have a value of the location, perhaps a street address for a particular location.

In 306, conversational agent engine 120 may employ API orchestration module 126 to perform operations determined in 304 at API 130. Conversational agent 120 may embed or include parameters determined in 302 in appropriate fashions for execution by API 130. In an embodiment, conversational agent engine 120 may use a set of heuristics to build a set of labels that may be used to name entities and actions and enrich the entities with known synonyms. To continue the mapping example, API orchestration model 126 may cause an operation that retrieves a set of directions from API 130 while passing the street address for the particular location determined in 304 to API 130 as a parameter.

In 308, conversational agent engine 120 may receive results or other suitable verification from API 130 about the executed operations. Conversational agent engine 120 may return the results to user 102 in a suitable format. Conversational agent engine 120 may format the information in appropriate fashions prior to returning the information to user 102. In the mapping example, conversational agent engine 120 may provide user 102 a text-based description of the directions to the entered street address, audibly present the directions to the user, or otherwise make use of the information retrieved from API 130.

Figure 4:
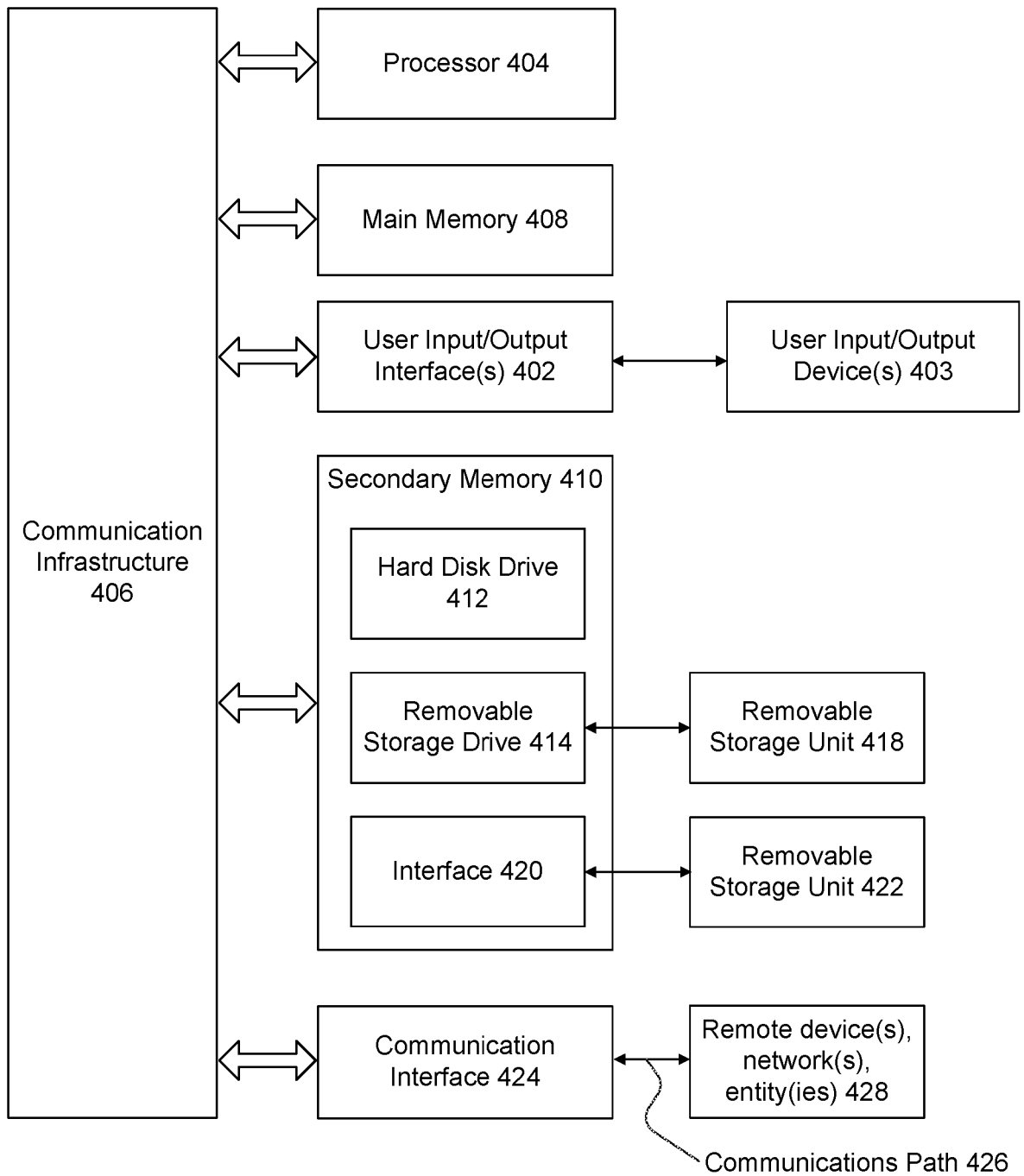
FIG. 4 illustrates a computer system, according to exemplary embodiments of the present disclosure.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
retrieving, by one or more processors, semantic annotations and an API specification that describes capabilities exposed by an API and specifies one or more API endpoints, one or more operations, data shapes for requests and responses, and input parameters;
forming, by the one or more processors, a semantic data graph that represents a plurality of entities connected by relations in a specific domain by combining the API specification, the semantic annotations, and a domain model, wherein the domain model defines concepts, taxonomies, properties and the relations within the specific domain, wherein each entity in the plurality of entities is accessible as an API endpoint among the one or more API endpoints, and wherein the relations between the plurality of entities in the semantic data graph are mapped to the one or more operations; and
building, by the one or more processors, a conversational agent using the semantic data graph, wherein the conversational agent receives a natural language query from a user, translates the natural language query to the one or more operations exposed by the API, determines a response, and provides the response to the user.

2. The method of claim 1, further comprising:
determining, by the one or more processors, an endpoint reference in the one or more API endpoints and an operation in the one or more operations based on the natural language query using the conversational agent;
causing, by the one or more processors, the operation to execute at the endpoint reference;
receiving, by the one or more processors, a result of the execution; and
providing, by the one or more processors, the result in the response.

3. The method of claim 1, further comprising:
determining, by the one or more processors, an ambiguity in the natural language; and
formulating, by the one or more processors, a follow-up question based on the semantic data graph using the conversational agent.

4. The method of claim 1, wherein the conversational agent is a personal digital assistant.

5. The method of claim 1, wherein the conversational agent is embedded in a social media platform.

6. The method of claim 1, wherein the conversational agent is an internet-of-things device.

7. A system, comprising:
a memory; and
at least one processor coupled to the memory and configured to:
retrieve semantic annotations and an API specification that describes capabilities exposed by an API and specifies one or more API endpoints, one or more operations, data shapes for requests and responses, and input parameters;
form a semantic data graph that represents a plurality of entities connected by relations in a specific domain by combining the API specification, the semantic annotations, and a domain model, wherein the domain model defines concepts, taxonomies, properties, and the relations within the specific domain, wherein each entity in the plurality of entities is accessible as an API endpoint among the one or more API endpoints, and wherein the relations between the plurality of entities in the semantic data graph are mapped to the one or more operations; and
build a conversational agent using the semantic data graph, wherein the conversational agent receives a natural language query from a user, translates the natural lanquaqe query to the one or more operations exposed by the API, determines a response, and provides the response to the user.

8. The system of claim 7, the at least one processor further configured to:
determine an endpoint reference in the one or more API endpoints and an operation in the one or more operations based on the natural language query using the conversational agent;
cause the operation to execute at the endpoint reference;
receive a result of the execution; and
provide the result in the response.

9. The system of claim 7, the at least one processor further configured to:
determine an ambiguity in the natural language; and
formulate a follow-up question based on the semantic data graph using the conversational agent.

10. The system of claim 7, wherein the conversational agent is a personal digital assistant.

11. The system of claim 7, wherein the conversational agent is embedded in a social media platform.

12. The system of claim 7, wherein the conversational agent is an internet-of-things device.

13. A non-transitory computer-readable device having instructions stored thereon that, when executed by at least one computing device, causes the at least one computing device to perform operations comprising:
retrieving semantic annotations and an API specification that describes capabilities exposed by an API and specifies one or more API endpoints, one or more operations, data shapes for requests and responses, and input parameters;

forming a semantic data graph that represents a plurality of entities connected by relations in a specific domain by combining the API specification, the semantic annotations, and a domain model, wherein the domain model defines concepts, taxonomies, properties, and the relations within the specific domain, wherein each entity in the plurality of entities is accessible as an API endpoint among the one or more API endpoints, and wherein the relations between the plurality of entities in the semantic data graph are mapped to the one or more operations; and building a conversational agent using the semantic data graph, wherein the conversational agent receives a natural language query from a user, translates the natural language query to the one or more operations by the API, determines a response, and provides the response to the user.

14. The non-transitory computer-readable device of claim 13, the operations further comprising:

determining an endpoint reference in the one or more API endpoints and an operation in the one or more operations based on the natural language query using the conversational agent;

causing the operation to execute at the endpoint reference;

receiving a result of the execution; and providing the result in the response.

15. The non-transitory computer-readable device of claim 13, the operations further comprising:

determining an ambiguity in the natural language; and formulating a follow-up question based on the semantic data graph using the conversational agent.

16. The non-transitory computer-readable device of claim 13, wherein the conversational agent is a personal digital assistant.

17. The non-transitory computer-readable device of claim 13, wherein the conversational agent is embedded in a social media platform.

* * * * *